(12) United States Patent  
Saito

(10) Patent No.: US 9,335,342 B2
(45) Date of Patent: May 10, 2016

(54) SCANNING TUNNELING MICROSCOPE AND METHOD OF DISPLAYING OBSERVATION IMAGE

(71) Applicant: JAPAN SCIENCE AND TECHNOLOGY AGENCY, Saitama (JP)

(72) Inventor: Akira Saito, Ibaraki (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 0 days.

(21) Appl. No.: 14/432,728

(22) PCT Filed: Oct. 3, 2013

(86) PCT No.: PCT/JP2013/076957
§ 371 (c)(1),
(2) Date: Mar. 31, 2015

(87) PCT Pub. No.: WO2014/054741
PCT Pub. Date: Apr. 10, 2014

(65) Prior Publication Data
US 2015/0260756 A1    Sep. 17, 2015

(30) Foreign Application Priority Data
Oct. 3, 2012    (JP) .................................. 2012-221324

(51) Int. Cl.
*H01J 37/26*    (2006.01)
*G01Q 60/12*    (2010.01)
*G01Q 30/04*    (2010.01)

(52) U.S. Cl.
CPC ................ *G01Q 60/12* (2013.01); *G01Q 30/04* (2013.01)

(58) Field of Classification Search
USPC .......... 250/306, 307, 309, 310, 311; 850/8, 9, 850/26, 27, 28
See application file for complete search history.

(56) References Cited

U.S. PATENT DOCUMENTS

| 5,623,295 | A | * | 4/1997 | Kishi et al. ..................... 347/111 |
| 5,898,176 | A | * | 4/1999 | Mori et al. ........................ 850/9 |
| 2007/0194225 | A1 | * | 8/2007 | Zorn .............................. 250/306 |

FOREIGN PATENT DOCUMENTS

| JP | H07239337 A | 9/1995 |
| JP | H08285871 A | 11/1996 |
| JP | 3009199 B2 | 2/2000 |
| WO | 0223159 A1 | 3/2002 |

OTHER PUBLICATIONS

Jan. 7, 2014 International Search Report issued in International Application No. PCT/JP2013/076957.

* cited by examiner

*Primary Examiner* — Nicole Ippolito
(74) *Attorney, Agent, or Firm* — Kenealy Vaidya LLP

(57) ABSTRACT

A scanning tunneling microscope includes a probe, a control unit that controls a distance between that probe and a sample, a voltage applying unit that supplies a direct current voltage between the probe and the sample, a measurement unit that measures a tunneling current that flows between the probe and the sample by the direct current voltage, an extraction unit that extracts as an observation value a specified frequency component from instantaneous values of the tunneling current measured by the measurement unit, and an observation information generation unit that generates observation information that includes information relating to at least one of a chemical state and an internal structure of a surface of the sample on the basis of the observation value extracted by the extraction unit.

9 Claims, 3 Drawing Sheets

SCANNING TUNNELING MICROSCOPE AND METHOD OF DISPLAYING OBSERVATION IMAGE

CROSS REFERENCE TO RELATED APPLICATION

This application is a national phase filing under 35 C.F.R. §371 of and claims priority to PCT Patent Application No. PCT/JP2013/076957, filed on Oct. 3, 2013 which claims the priority benefit under 35 U.S.C. §119 of Japanese Patent Application No. 2012-221324, filed on Oct. 3, 2012, the entire contents of which are hereby incorporated in their entireties by reference.

TECHNICAL FIELD

The present invention relates to a scanning tunneling microscope and a method of displaying an observation image.

BACKGROUND ART

To observe minute shapes on the surface of a sample, scanning tunneling microscopes (STM) have been used widely. Some of such conventional scanning tunneling microscopes include one that applies alternating current voltage as well as direct current voltage between a probe and a sample to generate a current, extracts an alternating current component from the generated current, and measures the frequency characteristics of a conductance component and a susceptance component of admittance between the probe and the sample from the extracted alternating current component, thereby analyzing the kind and composition of a material on the surface of the sample (cf., PTL 1).

A method known in the art includes locally irradiating intensity-modulated laser light with a predetermined frequency onto the surface of a sample to generate micro displacement based on a photo-acoustic effect and observing the micro displacement with a scanning tunneling microscope for obtaining information about the surface or inside of the sample (cf., PTL 2).

CITATION LIST

Patent Literature

PTL 1: JP 07-239337 A
PTL 2: JP 3009199

SUMMARY OF INVENTION

Technical Problem

The scanning tunneling microscope disclosed in PTL 1 indispensably includes a circuit for applying alternating current voltage between a probe and a sample in addition to direct current voltage used in a conventional scanning tunneling microscope. To incorporate such a circuit into the conventional tunneling microscope requires a large-scale modification of it and thus is uneasy to achieve. Although the scanning tunneling microscope disclosed in PTL 1 may enable analysis of the kind and composition of a material on the surface of the sample, it fails to enable observation of the chemical state and/or the internal structure of the surface of the sample.

To generate micro displacement based on the photo-acoustic effect, the method disclosed in PTL 2 requires localized irradiation of laser light, which is intensity-modulated at a predetermined frequency, onto the surface of a sample. Similarly, it is uneasy to achieve this by modification of the conventional scanning tunneling microscope. Although the method disclosed in PTL 2 may enable one to obtain information about defects such as cracks or about micro regions with different thermal impedances, it fails to enable observation of the chemical state and/or the internal structure of the surface of the sample.

Solution to Problem

According to a first aspect of the present invention, a scanning tunneling microscope comprises: a probe; a control unit that controls a distance between the probe and a sample; a voltage applying unit that applies a direct current voltage between the probe and the sample; a measurement unit that measures a tunneling current that flows between the probe and the sample by the direct current voltage; an extraction unit that extracts as an observation value a specified frequency component from instantaneous values of the tunneling current measured by the measurement unit; and an observation information generation unit that generates observation information that includes information relating to at least one of a chemical state and an internal structure of a surface of the sample on the basis of the observation value extracted by the extraction unit.

According to a second aspect of the present invention, in the scanning tunneling microscope of the first aspect, it is preferred that the extraction unit extracts as the observation value a frequency component having a frequency, an upper limit of which frequency is below 50 kHz, from the instantaneous values of the tunneling current.

According to a third aspect of the present invention, in the scanning tunneling microscope of the first or second aspect, it is preferred that the extraction unit extracts as the observation value a frequency component having a frequency, a lower limit of which frequency is equal to or greater than 0.01 kHz, from the instantaneous values of the tunneling current.

According to a fourth aspect of the present invention, in the scanning tunneling microscope of any one of the first to third aspects, it is preferred that the observation information generation unit further generates second observation information about a shape of the surface of the sample based on a time average value of the tunneling current measured by the measurement unit.

According to a fifth aspect of the present invention, in the scanning tunneling microscope of any one of the first to fourth aspects, it is preferred that the control unit controls the distance between the probe and the sample to make constant a time average value of the tunneling current measured by the measurement unit.

According to a sixth aspect of the present invention, in the scanning tunneling microscope of any one of the first to fourth aspects, it is preferred that the control unit controls the distance between the probe and the sample to make constant the distance between the probe and the sample.

According to a seventh aspect of the present invention, a method of displaying an observation image using a scanning tunneling microscope including a probe and a display monitor comprises: measuring a tunneling current that flows between the probe and a sample upon applying a direct current voltage between the probe and the sample; extracting as an observation value a specified frequency component from instantaneous values of the measured tunneling current; and displaying an observation image including information about at least one of a chemical state and an internal structure of a surface of the sample at the display monitor based on the extracted observation value.

According to an eight aspect of the present invention, in the method of displaying an observation image of the seventh aspect, it is preferred that a frequency component having a frequency, an upper limit of which frequency is below 50 kHz, is extracted from the instantaneous values of the tunneling current as the observation value.

According to a ninth aspect of the present invention, in the method of displaying an observation image of the seventh or eight aspect, it is preferred that a frequency component having a frequency, a lower limit of which frequency is equal to or greater than 0.01 kHz, is extracted from the instantaneous values of the tunneling current as the observation value.

Advantageous Effects of Invention

The present invention provides a scanning tunneling microscope that enables observation of the chemical state and/or the internal structure of the surface of the sample without difficulty.

DESCRIPTION OF EMBODIMENTS

Figure 1:
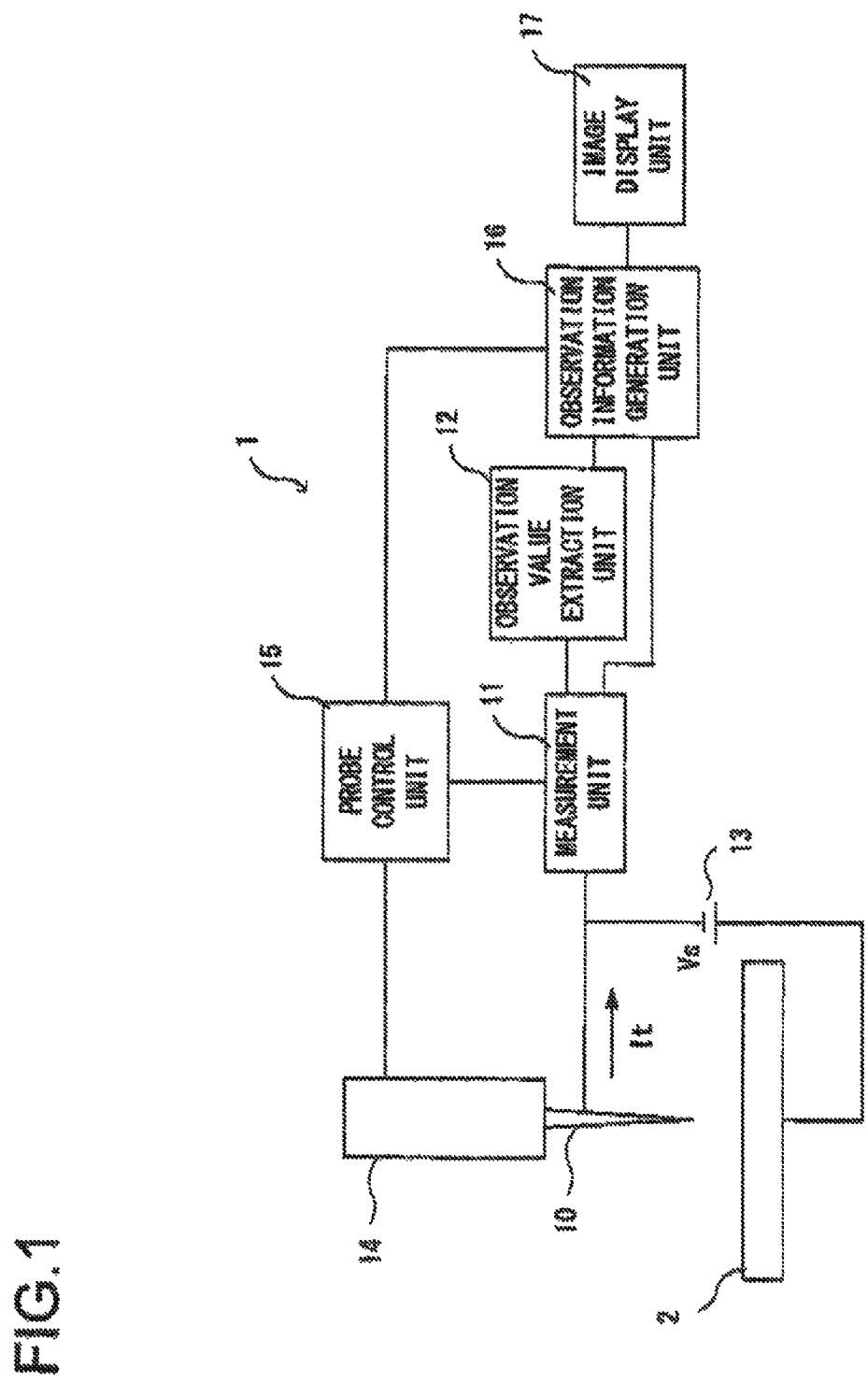
FIG. 1 is a block diagram showing the structure of the scanning tunneling microscope according to an embodiment of the present invention.

A scanning tunneling microscope according to an embodiment of the present invention is described below. FIG. 1 is a block diagram showing an example of the structure of a scanning tunneling microscope 1 according to an embodiment of the present invention. The scanning tunneling microscope 1 shown in FIG. 1 includes a probe 10, a measurement unit 11, an observation value extraction unit 12, a direct current source 13, a probe support unit 14, a probe control unit 15, an observation information generation unit 16, and an image display unit 17. FIG. 1 shows a state in which the scanning tunneling microscope 1 has a sample 2 attached to it as an observation object.

The probe 10, which is made of an electroconducting material such as metal, is attached to the probe support unit 14. The tip section of the probe 10 has a sharp pointed shape. Bringing the tip section of the probe 10 close up to a position at a distance of several angstroms from the surface of the sample 2 and applying a predetermined direct current bias voltage Vs between the probe 10 and the sample 2 allows a tunneling current It to flow between the probe 10 and the sample 2.

The measurement unit 11 measures this tunneling current It that flows between the probe 10 and the sample 2 as described above. The values of the tunneling current It measured by the measurement unit 11 are outputted from the measurement unit 11 to the observation value extraction unit 12, the probe control unit 15, and the observation information generation unit 16.

The observation value extraction unit 12 extracts specified frequency components of the measured values (instantaneous values) of the tunneling current It outputted from the measurement unit 11 as observation values. The range of frequency components to be extracted by the observation value extraction unit 12 as observation values may be preset or freely set by an observer. The observation values extracted by the observation value extraction unit 12 are outputted from the observation value extraction unit 12 to the observation information generation unit 16. The observation value extraction unit 12 may be or include, for instance, a spectrum analyzer.

The probe support unit 14, to which the probe 10 is to be attached, varies the position of the probe 10 relative to the sample 2 precisely according to the control by the probe control unit 15. The probe control unit 15 controls the movement of the probe support unit 14 in accordance with the measured value of the tunneling current It outputted from the measurement unit 11 and thus controls the position of the probe 10 relative to the sample 2. This enables the distance between the probe 10 and the sample 2 to be controlled in accordance with the tunneling current It and also enables the probe 10 to be scanned along the surface of the sample 2. The result of such a control of the position of the probe 10 by the probe control unit 15 is outputted from the probe control unit 15 to the observation information generation unit 16. The probe support unit 14 may be or include, for instance, a piezo device.

When the probe 10 scans the surface of the sample 2 in accordance with the control of position by the probe control unit 15, the observation information generation unit 16 obtains each piece of the information outputted from the measurement unit 11, the observation value extraction unit 12, and the probe control unit 15. In other words, it obtains a measured value of the tunneling current It outputted from the measurement unit 11, an observation value of the tunneling current It extracted by and outputted from the observation value extraction unit 12, and the result of the control of the position of the probe 10 outputted from the probe control unit 15. Based on these pieces of information, the observation information generation unit 16 generates image information for representing two kinds of observation images about the sample 2 and outputs the generated information to the image display unit 17.

The image display unit 17 displays both the two kinds of observation images concerning the sample 2 simultaneously or either one of them selectively. The display unit 17 may be a display monitor that includes, for instance, a liquid crystal display.

One of the observation images displayed by the image display unit 17 is based on a time-average value obtained by averaging the measured values of the tunneling current It from the measurement unit 11 by a predetermined time unit similarly to the observation image generated by the conventional scanning tunneling microscope. This observation image is referred to hereafter as "conventional-mode observation image". The other of the observation images, unlike the observation image obtained by the conventional scanning tunneling microscope, is based on the observation value from the observation value extraction unit 12, that is, based on the specified frequency component extracted from the instantaneous values of the tunneling current It. This observation image is referred to hereafter as "new-mode observation image".

Now, the principle of the scanning tunneling microscope according to the present invention is explained. The tunneling current It flowing between the probe 10 and the sample 2 depends largely on the distance between the probe 10 and the sample 2 as is well known in the art. Any change in distance, for instance, a change in distance by half an atom or so will give a considerable change in current. The scanning tunneling microscope 1 uses this to enable one to observe the minute shapes on the surface of the sample 2. That is, the probe 10 moves for scanning under control by the probe control unit 15 of its distance from the sample 2 to make constant the magnitude of time average value to be obtained by time averaging the tunneling current It by a predetermined unit time. Observing the movement of the probe support unit 14 in the direction of height relative to the sample 2 on this occasion allows observation of the minute shapes on the surface of the sample 2. Such an observation method is called a method of a constant current mode.

The minute shapes on the surface of the sample 2 may also be observed by moving the probe 10 for scanning by the probe control unit 15, keeping the height of the probe 10 relative to the sample 2 constant and observing the magnitude of time average value obtained by time averaging the tunneling current It on this occasion by a predetermined time unit. Such an observation method is called a method of a constant height mode.

The conventional-mode observation image based on the time average value of the tunneling current It, which is one of the two kinds of the observation images displayed by the image display unit 17, represents the result of the observation by the well-known observation method. In the constant current mode, the scanning tunneling microscope 1 displays an image representing the height of the probe 10 relative to the sample 2 at each scanning position on the image display unit 17 as the conventional-mode observation image. This is performed based on the result of the control of the position of the probe 10 outputted from the probe control unit 15 for a constant time average value of the tunneling current It. In the constant height mode, the scanning tunneling microscope 1 displays an image representing the magnitude of the time average value of the tunneling current It at each scanning position at the image display unit 17 as the conventional-mode observation image. This is performed based on the measured value of the tunneling current It outputted from the measurement unit 11 for a constant height of the probe 10 relative to the sample 2.

The new-mode observation image, which is the other image displayed by the image display unit 17, is an image based on the specified frequency components extracted from the instantaneous values of the tunneling current It as mentioned above. That is, the scanning tunneling microscope 1 displays an image representing the magnitude of the spectrum of the specified frequency components in the instantaneous values of the tunneling current It as each scanning position as a new-mode observation image. This is performed based on the observation value outputted from the observation value extraction unit 12. This is true for both the constant current mode and the constant height mode.

Extraction of such frequency components provides new information for the following reasons. First, the tunneling current flowing between the sample (surface atoms) and the probe (atoms at the tip section of the probe) induces local quantum vibration in a system of the surface atoms, or a system including the atoms at the tip section of the probe in addition to the surface atoms. The induced quantum vibration causes a rapid change in local electronic states at the surface and the probe. Naturally, this change keenly reflects the chemical state and/or the internal structure of the surface at the atomic level, thus providing an intrinsic change reflecting the local chemical state and/or internal structure of the surface. Consequently, the local vibration appears as a high frequency change in the tunneling current that flows reflecting the local electronic states of the both the sample and the probe. The present invention presupposes extracting the effect of coupling of the high frequency vibration with the electronic state between the surface atoms and the atoms of the probe in an unprecedented form as the high frequency component of the tunneling current. In other word, the frequency component of the tunneling current It extracted by the observation value extraction unit 12 corresponds to the local vibration occurring at the surface of the sample 2 due to the flow of the tunneling current It.

Although the high frequency component of the tunneling current is extracted according to this embodiment, a method which proactively applies alternating high frequency voltage and observes signals as they are (without frequency decomposition) or a method which proactively applies alternating high frequency voltage and resolves signals at high frequency and extracts the resolved high frequency signals may be useful because of the reason as described above. In this respect, the present invention is based on a presupposition different from that of the conventional electrotechnical method disclosed in PTL 1, i.e., the method which separates an alternating current component from the current to which an alternating current voltage is applied and measures the characteristics of a conductance component and a susceptance component of admittance between the probe and the sample. The present invention uses a frequency band and a device configuration different from those of the conventional method accordingly.

Figure 2:
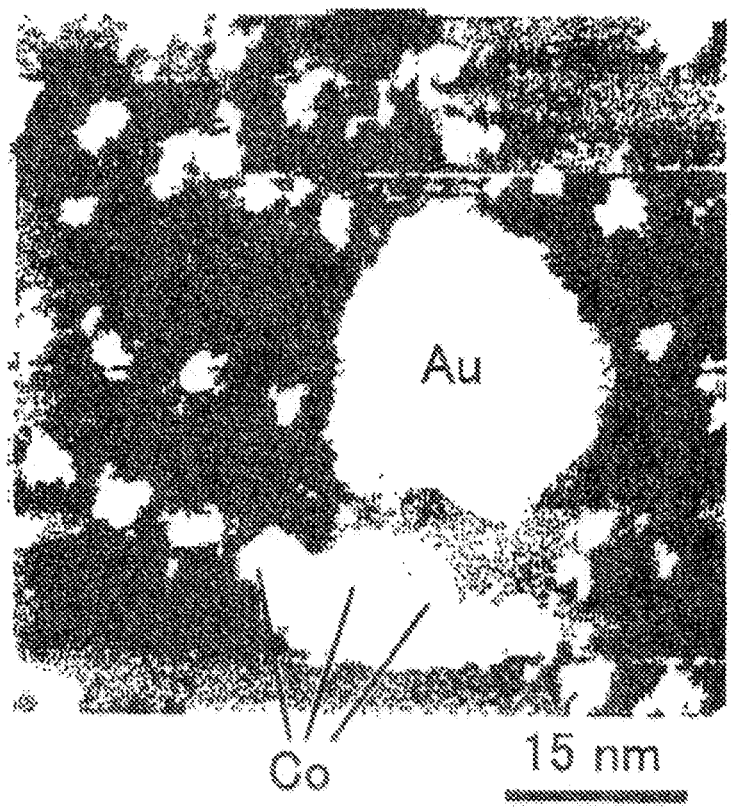
FIG. 2 is a view showing an example of a conventional-mode observation image obtained by the scanning tunneling microscope according to an embodiment of the present invention.

FIG. 2 shows an example of a conventional-mode observation image obtained by the scanning tunneling microscope 1 according to an embodiment of the present invention. This observation image is a conventional-mode observation image obtained by observing as the sample 2, in a constant current mode, Co nanoisland rows formed on a Co monoatomic layer vapor-deposited on a clean surface of an Au (111) substrate. Measurements were made under conditions of a direct current bias voltage Vs of 0.6 V and a tunneling current It of 0.5 nA.

In the conventional-mode observation image shown in FIG. 2, heights of the probe 10 relative to the sample 2 at respective scanning positions are represented by contrast of the image. In other words, a higher portion of the surface of the sample 2 is expressed in a brighter tone with a higher contrast, whereas a lower portion of the surface of the sample 2 is expressed in a darker tone with a lower contrast. This allows observation of the surface shape of the sample 2 from the conventional-mode observation image shown in FIG. 2. For instance, it is seen that four rows of Co nanoislands are formed in the direction from upper left to lower right of the figure, and on the lower part of the figure, a terrace that is lower than the other portions if formed. In the center right, a large flat island is shown, which is supposed to be possibly an island of Au from the shape and flatness of the whole island and the shape of edges.

Figure 3:
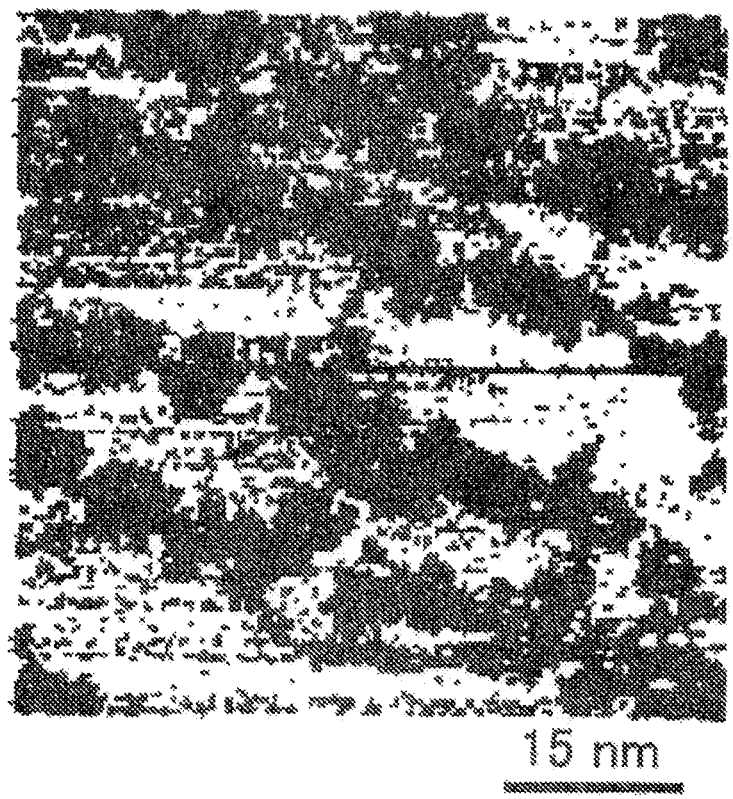
FIG. 3 is a view showing an example of a new-mode observation image obtained by the scanning tunneling microscope according to an embodiment of the present invention.

FIG. 3 shows an example of a new-mode observation image obtained by the scanning tunneling microscope 1 according to an embodiment of the present invention. This observation image is a new-mode observation image obtained by using the same sample 2 as that shown in FIG. 2 and observing the same part of it under the same measuring conditions as those used for the sample shown in FIG. 2. In this case, the observation value extraction unit 12 extracted the frequency component of 0.01 to 50 kHz from the instantaneous values of the tunneling current It outputted from the measurement unit 11 as the observation value.

In the new-mode observation image shown in FIG. 3, magnitude of the observation value at each scanning position is expressed by the contrast of the image. More particularly, for the frequency components of 0.01 to 50 kHz extracted as the observation value by the observation value extraction unit 12 from the instantaneous values of the tunneling current It, a portion of such frequency components having a larger spectrum is expressed in brighter tone with a higher contrast, whereas a portion of such components having a smaller spectrum is expressed in a darker tone with a lower contrast.

Comparison of the conventional-mode observation image shown in FIG. 2 with that shown in FIG. 3 indicates that the shape of each Co nanoisland is unsharp in the conventional-mode observation mage shown in FIG. 2. Granular fragmental structures appear around each island, which structures correspond to collapsed islands by sweeping of the probe. In addition, the structures of the inside and peripheries of each island are vague. In contrast, the new-mode observation image shown in FIG. 3 indicates that the shape of each Co nanoisland is expressed in a darker tone with a lower contrast and that the distribution of Co is actually broader than the white portion in FIG. 2, i.e., a higher portion as viewed simply by height of the structure. This clearly indicates that Co at the atomic level is distributed around the nanoislands. This finding is reasonable referring to the process of collapsing of each Co nanoisland by sweeping of the probe, although this information is unavailable from FIG. 2 according to the conventional method. Apparently, for some of the islands, their internal structure can be confirmed.

In addition, in the conventional-mode observation image shown in FIG. 2, a terrace formed at a lower part of the figure is shown in a brighter tone with a higher contrast than a still lower terrace. In contrast, in the new-mode observation image shown in FIG. 3, the higher and lower terraces are expressed in the same degree of contrast (because they are made of the same Au). The large island in the center right of FIG. 2 seems bright reflecting the contrast in height (FIG. 2). In FIG. 3, such an island has the same brightness as that of the surrounding terraces. This indicates that this island is made of the same Au as that of the surrounding terraces (this being unseen from FIG. 2). The new-mode observation image in FIG. 3 enables one to confirm that Co is adsorbed along a step located on an outer peripheral boundary of this large island or on the peripheral part of the terrace on the lower part of the figure. The conventional-mode observation image in FIG. 2 disallows this to be confirmed.

As explained above, the new-mode observation image shown in FIG. 3 indicates not only the kind and composition of the material at the surface of the sample 2 but also its chemical state (atomic state). That is, it indicates Co adsorbed along the step at the boundary of the terrace, the internal structure of the surface of the sample 2 (extremely fine surface distribution attributable to the chemical species, chemical state or other electromagnetic or structural factors), that is, the internal structure or other structures of Co nanoislands. These observation results are unavailable from the conventional-mode observation image shown in FIG. 2. In addition, the new-mode observation image shown in FIG. 3 allows observation of both the chemical state and the internal structure of the surface of the sample 2 from quantum local vibration of the surface of the sample 2 caused by the tunneling current. This enables induction of local vibration and observation of the sample to occur at the same time in one and the same system unlike the conventional technique which induces micro vibration on the surface of the sample by using, for instance, photo-acoustic effect.

The embodiment explained above can exhibit operations and advantageous affects in (1) to (3) below.

(1) In the scanning tunneling microscope 1, the probe control unit 15 controls the distance between the probe 10 and sample 2. The measurement unit 11 measures tunneling current It flowing between the probe 10 and sample 2 due to direct current voltage applied between the probe 10 and the sample 2 from the direct current source 13. The observation value extraction unit 12 extracts specified frequency component from the instantaneous values of the tunneling current It measured by the measurement unit 11 as an observation value. Based on this observation value, the observation information generation unit 16 generates image information for representing a new-mode observation image including information about the chemical state and/or the internal structure of the surface of the sample 2. Then, it causes the new-mode observation image as shown in FIG. 3 to be displayed at the image display unit 17. This enables one to produce without difficulty the scanning tunneling microscope 1 capable of observing the chemical state and/or the internal structure of the surface of the sample 2.

(2) The observation information generation unit 16 further generates image information for representing the conventional-mode observation image about the shape of the surface of the sample based on the time average value of the tunneling current It measured by the measurement unit 11. Then, it causes the conventional-mode observation image as shown in FIG. 2 to be displayed at the image display unit 17. This enables one to obtain the new-mode observation image as shown in FIG. 3 and the conventional-mode observation image as shown in FIG. 2 concomitantly.

(3) The probe control unit 15 controls the distance between the probe 10 and the sample 2 to make constant the time average value of the tunneling current It measured by the measurement unit 11 in the constant current mode, whereas in the constant height mode, to make constant the distance between the probe 10 and the sample 2. This enables the distance between the probe 10 and the sample 2 to be controlled by an appropriate method depending on, for instance, the kind of the sample 2, the shape of the surface of the sample 2 and various conditions upon measuring.

In the embodiment described above, the observation image as shown in FIG. 2 is presented as an example of the conventional-mode observation image and also the observation image as shown in FIG. 3, which shows the chemical state and/or the internal structure of the surface of the sample 2, is presented as an example of the new-mode observation image. However, the observation image to be obtained by the scanning tunneling microscope according to the present invention is not limited to these. For instance, an observation image that shows either the chemical state or the internal structure of the surface of the sample 2 may be obtained as the new-mode observation image.

Although an example has been explained, in which the observation value extraction unit 12 extracts as an observation value a frequency component of 0.01 to 50 kHz from the instantaneous values of the tunneling current It, the range of the frequency components to be extracted by the observation value extraction unit 12 is not limited to the above example. For instance, this range may be set narrower by decreasing the upper limit of the frequency component to be extracted as the observation value to a value smaller than 50 kHz or increasing the lower limit of such frequency component to a value greater than 0.01 kHz. That is, a frequency component having an upper limit frequency below 50 kHz or a frequency component having a lower limit frequency equal to or higher than 0.01 kHz may be extracted from the instantaneous values of the tunneling current It as an observation value. This also enables the new-mode observation image as shown in FIG. 3 to be obtained based on the extracted observation value. Alternatively, a frequency component outside the range of 0.01 to 50 kHz may be extracted as the observation value.

Frequency components having a frequency of any desired range may be extracted as observation values from the instantaneous values of the tunneling current It if such a frequency component enables generation of observation information about at least one of the chemical state or the internal structure of the surface of the sample 2.

Furthermore, in the embodiment described above, an example has been explained in which the observation information generation unit 16 generates image information based on each pieces of the obtained information and outputs the generated image information to the image display unit 17 to cause the conventional-mode observation image as shown in FIG. 2 or the new-mode observation image as shown in FIG. 3 to be displayed at the image display unit 17. However, the scanning tunneling microscope according to the present invention is not limited to one that displays such observation images. For instance, it may include a printer instead of the image display unit 17 to print the conventional-mode observation images and/or the new-mode observation images. Alternatively, the image information generated by the observation information generation unit 16 may be outputted to a computer or a storage device connected to the external. Furthermore, the observation information generation unit 16 may generate and output the information about the height of the probe 10 relative to the sample 2 at each scanning position (in a constant current mode) or the time average value of the tunneling current It (in a constant height mode) and the observation value at each scanning position, i.e., information about the spectrum of the specified frequency components extracted by the observation value extraction unit 12 from the instantaneous values of the tunneling current It in a format other than that of the image information. In other words, the observation information generation unit 16 can generate various pieces of observation information about the shape of the surface of the sample 2 based on the time average value of the tunneling current It measured by the measurement unit 11. In addition, it can generate various pieces of observation information including information about at least one of the chemical state and/or the internal structure of the surface of the sample 2 based on the observation value extracted by the observation value extraction unit 12.

According to an embodiment other than the above-mentioned embodiment, a method can be provided which displays an observation image at a printer or other medium and allows one to understand the chemical state and/or the internal structure of the surface of the sample without using the observation image. This method includes, instead of moving the probe for scanning to obtain an image, stopping the probe at a position on an observation area and sweeping applied direct current voltage at the point to obtain a high frequency component of the tunneling current I and provides an I-V spectrum ("V" indicating applied voltage). This I-V spectrum, which provides more detailed information about the chemical state and/or the internal structure reflecting the local electronic state at a position fixed just under the atom of the tip section of the probe, can be obtained in the form of a high frequency component of the tunneling current I that corresponds to the applied voltage V (i.e., electron level under observation).

The above described embodiments and various modifications are exemplary and the present invention is not limited to these so far as the features of the invention are not damaged.

Disclosure of the following base application to which priority is claimed in the present application is incorporated herein by reference: Japanese Patent Application No. 2012-221324 (filed Oct. 3, 2012).

REFERENCE SIGNS LIST 1 scanning tunneling microscope
2 sample
10 probe
11 measurement unit
12 observation value extraction unit
13 direct current source
14 probe support unit
15 probe control unit
16 observation information generation unit
17 image display unit

The invention claimed is:

1. A scanning tunneling microscope comprising:
a probe;
a control unit that controls a distance between the probe and a sample;
a voltage applying unit that applies a non-modulated current voltage between the probe and the sample;
a measurement unit that measures a tunneling current that flows between the probe and the sample by the direct current voltage;
an extraction unit that extracts as an observation value a specified frequency component from instantaneous values of the tunneling current measured by the measurement unit; and
an observation information generation unit that generates observation information that includes information relating to at least one of a chemical state and an internal structure of a surface of the sample on the basis of the observation value extracted by the extraction unit.

2. A scanning tunneling microscope according to claim 1, wherein
the extraction unit extracts as the observation value a frequency component having a frequency, an upper limit of which frequency is below 50 kHz, from the instantaneous values of the tunneling current.

3. A scanning tunneling microscope according to claim 1, wherein
the extraction unit extracts as the observation value a frequency component having a frequency, a lower limit of which frequency is equal to or greater than 0.01 kHz, from the instantaneous values of the tunneling current.

4. A scanning tunneling microscope according to claim 1, wherein
the observation information generation unit further generates second observation information about a shape of the surface of the sample based on a time average value of the tunneling current measured by the measurement unit.

5. A scanning tunneling microscope according to claim 1, wherein
the control unit controls the distance between the probe and the sample to make constant a time average value of the tunneling current measured by the measurement unit.

6. A scanning tunneling microscope according to claim 1, wherein
the control unit controls the distance between the probe and the sample to make constant the distance between the probe and the sample.

7. A method of displaying an observation image using a scanning tunneling microscope including a probe and a display monitor, the method comprising:
measuring a tunneling current that flows between the probe and a sample upon applying a non-modulated direct current voltage between the probe and the sample;
extracting as an observation value a specified frequency component from instantaneous values of the measured tunneling current; and
displaying an observation image including information about at least one of a chemical state and an internal structure of a surface of the sample at the display monitor based on the extracted observation value.

8. A method of displaying an observation image according to claim 7, wherein
a frequency component having a frequency, an upper limit of which frequency is below 50 kHz, is extracted from the instantaneous values of the tunneling current as the observation value.

9. A method of displaying an observation image according to claim 7, wherein a frequency component having a frequency, a lower limit of which frequency is equal to or greater than 0.01 kHz, is extracted from the instantaneous values of the tunneling current as the observation value.

* * * * *